(12) United States Patent
Takahashi et al.

(10) Patent No.: US 8,628,740 B2
(45) Date of Patent: Jan. 14, 2014

(54) PROCESSING METHOD FOR RECOVERING IRON OXIDE AND HYDROCHLORIC ACID

(75) Inventors: Nobuyoshi Takahashi, Saitama (JP); Osama Taki, Tokyo (JP); Herbert Weissenbaeck, Vienna (AT); Dieter Vogl, Wolfpassing (AT)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 0 days.

(21) Appl. No.: 13/000,216

(22) PCT Filed: Jun. 18, 2009

(86) PCT No.: PCT/EP2009/057623
§ 371 (c)(1),
(2), (4) Date: Dec. 20, 2010

(87) PCT Pub. No.: WO2009/153321
PCT Pub. Date: Dec. 23, 2009

(65) Prior Publication Data
US 2011/0158869 A1    Jun. 30, 2011

(30) Foreign Application Priority Data
Jun. 19, 2008 (JP) ................. 2008-160890

(51) Int. Cl.
*B01D 11/00* (2006.01)
*B01D 49/00* (2006.01)
(52) U.S. Cl.
USPC .............. 423/150.3; 423/150.1; 423/592.1; 423/140; 423/138
(58) Field of Classification Search
USPC .............. 423/150.3, 150.1, 592.1, 140, 138
See application file for complete search history.

(56) References Cited

U.S. PATENT DOCUMENTS 3,852,430 A    12/1974   Lienau et al.

FOREIGN PATENT DOCUMENTS

| GB | 1 406 945 | | 9/1975 |
| WO | 8603521 A1 | | 6/1986 |
| WO | WO8603521 A1 | * | 6/1986 |

* cited by examiner

*Primary Examiner* — Melvin C Mayes
*Assistant Examiner* — Melissa Stalder
(74) *Attorney, Agent, or Firm* — Laurence A. Greenberg; Werner H. Stemer; Ralph E. Locher

(57) ABSTRACT

A method of processing waste iron chloride solution including ferrous chloride, ferric chloride or mixtures thereof and optionally free hydrochloric acid, includes concentrating waste iron chloride solution into concentrated liquid having iron chloride concentration of at least 30%-40% by weight; optionally oxidizing ferrous chloride in the concentrated liquid from the concentration step to ferric chloride providing liquid containing ferric chloride; hydrolyzing the liquid containing ferric chloride from the oxidation step at 155-350° C., maintaining the ferric chloride concentration at least at 65% by weight, generating steam containing hydrogen chloride and liquid containing ferric oxide; separating ferric oxide from the liquid containing ferric oxide in the hydrolysis step; condensing steam containing hydrogen chloride in the hydrolysis step, recovering hydrochloric acid at a concentration of at least 10%-15% by weight; and using condensation energy of the hydrogen chloride containing steam in the recovery step to heat the concentration step performed under reduced pressure.

10 Claims, 2 Drawing Sheets

PROCESSING METHOD FOR RECOVERING IRON OXIDE AND HYDROCHLORIC ACID

Figure 1:
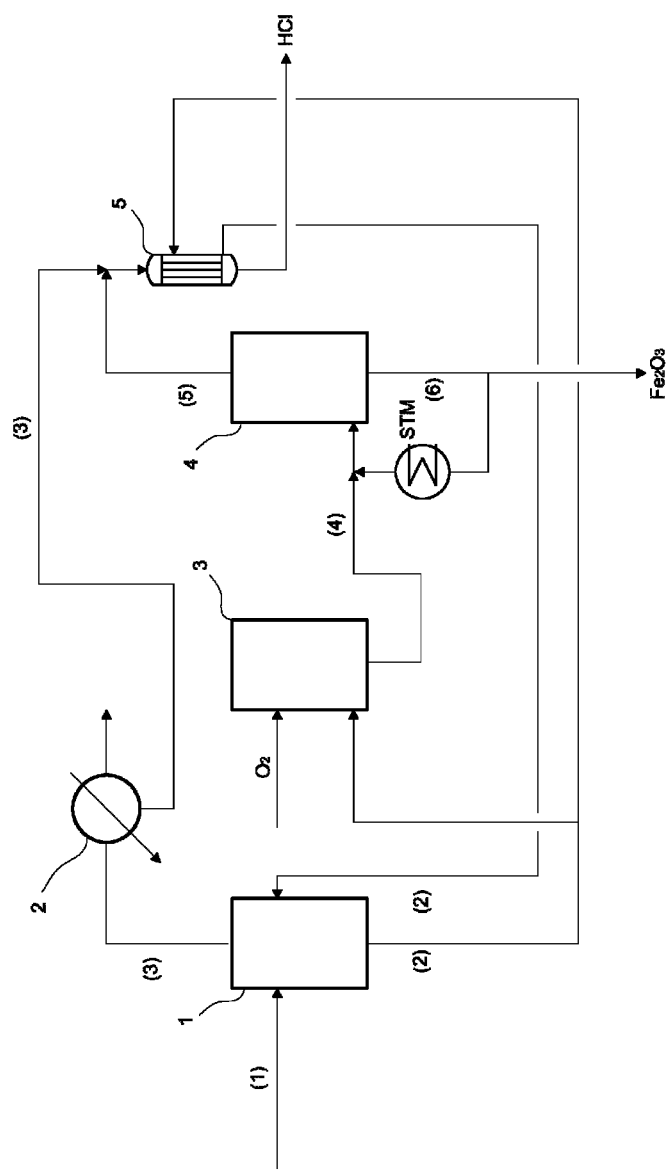

The present invention relates to a method of processing waste iron chloride solution, more particularly to a processing method for recovering iron oxide and hydrochloric acid.

In the iron and steel industry, in the zinc plating industry etc., washing treatments with hydrochloric acid are widely used to remove rust and accretion (scales) adhering to the surface of products or processed goods. Further, leaching of iron containing ores is often realized by means of hydrochloric acid. Also semiconductor lead frames are often subjected to etching treatments with hydrochloric acid. In these treatments, the hydrochloric acid concentration is usually controlled to remain in the range of 12-18% by weight. As the treatment progresses, free hydrochloric acid is converted to iron salts and other metallic salts, thus gradually reducing the washing or etching capacity. Therefore, usually, free hydrochloric acid is added, thus generating large amounts of low concentrated waste liquid containing iron chloride and optionally free hydrochloric acid.

This waste iron chloride solution comprises ferrous chloride, ferric chloride or combinations thereof and optionally reaction products of other treated metals with hydrochloric acid, like chlorides of zinc, nickel, copper, etc., and such liquids have been disposed of as industrial waste. In recent years, the costs of disposal or treatment of such industrial waste have risen sharply, and hydrochloric acid itself is relatively expensive. Therefore, it is uneconomical to dispose waste iron chloride solution like that. As this also poses big environmental and pollution problems, methods have been suggested to recover hydrochloric acid, iron oxide, ferric chloride or combinations thereof from waste iron chloride solution.

One such recovery method is roasting. In the roasting method, waste iron chloride solution containing ferrous chloride is roasted and oxidized in a roaster and separated into iron oxide and hydrogen chloride containing gas, from which gas hydrochloric acid is absorbed by means of an absorber and recovered as hydrochloric acid having a relatively low concentration of about 18% by weight.

Another method is the liquid phase chlorine oxidation method, wherein chlorine is reacted with waste iron chloride solution containing ferrous chloride, whereby ferrous chloride is converted to ferric chloride, which is either reused as an etching liquid or recovered as ferric chloride for water treatment. As in this method chlorine also reacts with dissolved iron to generate ferric chloride, treatment and disposal of excess ferric chloride is essential. Recently, a method has been proposed wherein waste iron chloride solution containing ferrous chloride is concentrated by evaporation, the waste liquid, which has a higher ferrous chloride concentration, is oxidized to convert ferrous chloride to ferric chloride, and the liquid containing high concentrations of ferric chloride is hydrolyzed to generate iron oxide and to recover highly concentrated hydrochloric acid of at least 20% by weight (see JP 2006-137118 A). This method is similar to the so-called PORI process as e.g. described in U.S. Pat. No. 3,682,592 B.

However, since in the above roasting method the roasting requires very large amounts of fuel, the costs of recovering hydrochloric acid are invariably very high. Further, the combustion process produces waste gases, measures against NOx need to be taken, and it is problematic to emit HCl, $Cl_2$, dust, etc. into the atmosphere. In addition, $CO_2$ emissions due to the use of fuel have also become a problem in recent years.

On the other hand, in said liquid phase chlorine oxidation method, ferrous chloride may be converted to ferric chloride in a reactor. The facility is suitable for small volumes and may be built at low costs. However, as dangerously high pressurized chlorine gas is used, such facility needs safety measures for high pressure gas and chlorine gas removing equipment, and it is a big problem that recovery is limited to ferric chloride and hydrochloric acid may not be recovered.

Furthermore, the method described in JP 2006-137118 A is a useful method, wherein the iron component is recovered from waste iron chloride containing ferrous chloride as useful iron oxide, and hydrochloric acid is recovered at high concentrations of at least 20% by weight. However, the generated iron oxide has a very small particle diameter, so it is difficult to separate from the mother liquid, and it contains chlorine. In addition, it is difficult to effectively use the generated energy, and therefore this method is not efficient in terms of its energy balance. Although the hydrolysis step of the PORI process described in U.S. Pat. No. 3,682,592 B can be operated at higher temperatures than the process described in JP 2006-137118 A, the energy of the recovered hydrochloric acid is not internally reused in the process and thus the energy demand for the process is high.

The present invention aims to provide a method wherein iron oxide may be separated easily from the iron chloride solution as described above with higher purity and a wider range of applications than conventional methods, said method being effectively feasible using very little energy, and to provide a method wherein hydrochloric acid is recovered at the proper concentration to be used as it is for washing, leaching and etching.

The inventors have devoted themselves to research and have found a novel method that may achieve the above aims. Namely, they found that by concentrating said waste iron chloride solution to a concentrated liquid having an iron chloride concentration of at least 30% by weight, preferably at least 40% by weight, then converting the ferrous chloride (if any) to ferric chloride in an oxidation step and hydrolyzing the obtained liquid containing ferric chloride at a temperature of 155-350° C. while maintaining the ferric chloride concentration at a level of at least 65% by weight, hydrolysis will be much faster and more efficient, and the separated ferric oxide contains only low amounts of impurities such as chlorine etc. without generating iron oxychloride (FeOCl) as a byproduct. Further, it was found to be easier to separate from the mother liquid, because the average particle diameter is larger.

Further, it was found that in the process step of condensing the stream containing hydrogen chloride discharged from the hydrolysis step to recover hydrochloric acid, it is also possible to recover condensation energy to provide for a temperature of at least 75° C. during said concentration step which is performed under reduced pressure. This was found to be extremely advantageous, because the heat energy used in the entire process may thus be reduced by some 30 to 40%. In addition, it was found that when hydrolysis takes place in the temperature range mentioned above, the concentration of the recovered hydrochloric acid may be suitably controlled to be in the range of at least 10% by weight, preferably at least 15% by weight, and therefore, any concentration suitable for re-use may be selected.

These advantages can definitely not be achieved by the conventional process described in JP 2006-137118 A, wherein a liquid containing ferric chloride is hydrolyzed under reduced pressure of 0.01-0.02 MPa (absolute pressure) at a lower temperature of 125-150° C.

The present invention is based on the above findings and comprises the following major points.

According to a first aspect of the present invention, a method of processing waste iron chloride solution comprising ferrous chloride, ferric chloride or possible mixtures thereof, and optionally free hydrochloric acid is provided, said method comprising the following steps:

- a concentration step, wherein said waste iron chloride solution is concentrated to a concentrated liquid having a total iron chloride concentration of at least 30% by weight, preferably at least 40% by weight;
- optionally an oxidation step, wherein ferrous chloride contained in the concentrated liquid obtained from said concentration step is oxidized to ferric chloride to obtain a liquid containing ferric chloride;
- a hydrolysis step, wherein the liquid containing ferric chloride optionally obtained from said oxidation step is hydrolyzed at a temperature of 155-350° C. while maintaining the ferric chloride concentration at a level of at least 65% by weight, to generate a stream containing hydrogen chloride and liquid containing ferric oxide,
- a separation step, wherein ferric oxide is separated from said liquid containing ferric oxide obtained in said hydrolysis step and
- a recovery step, wherein the stream containing hydrogen chloride obtained in said hydrolysis step is condensed to recover hydrochloric acid at a concentration of at least 10% by weight, preferably at least 15% by weight, characterized in that the condensation energy of the hydrogen chloride containing stream obtained in the hydrolysis step is directly or indirectly used as a heating source for said concentration step, which concentration step is performed under reduced pressure.

The said method of processing waste iron solution comprises two process steps wherein evaporation takes place. In the hydrolysis step, a hydrogen chloride containing stream is generated. The other evaporation step is the said concentration step. The energy which is necessary to operate the said concentration step is provided by the condensation energy of the hydrogen chloride containing stream generated in the said hydrolysis step. Thus the overall operating energy consumption of said method of processing waste iron solution is reduced by 30-40% compared to the total evaporation energy of the waste iron solution. This is very advantageous because the energy consumption of the roasting method for processing iron chloride solution is determined by the total evaporation of said iron chloride solution.

Furthermore, it is advantageous that water is added to the stream containing hydrogen chloride obtained in said hydrolysis step either prior to or during said recovery step whereby condensation takes place, thus recovering hydrochloric acid from said stream at any adjustable concentration of at least 10% by weight, preferably at least 15% by weight, said stream containing hydrogen chloride being a heating source to provide for a temperature of at least 75° C. during said concentration step. By means of the addition of water to the hydrogen chloride containing stream, the concentration either prior or during the condensation is adjusted at a concentration which is lower than the aceotropic point to ensure a condensation temperature of the mixture of said hydrogen chloride containing stream and water of at least 75° C. This minimum temperature is necessary to ensure an efficient heat transfer to the concentrated liquid in said concentration step.

It is also of benefit if condensed aqueous solution obtained from said concentration step is used in addition to or instead of said water added to the stream containing hydrogen chloride. The waste iron chloride solution may comprise free hydrogen chloride as well. During said concentration step, wherein the waste iron chloride solution is concentrated by means of evaporation, free hydrogen chloride contained in said iron chloride solution is partially evaporated. If the condensed vapor obtained in the concentration step is added to the stream containing hydrogen chloride which is obtained in said hydrolysis step, the hydrogen chloride of the condensed vapor obtained in the concentration step may also be recovered. Otherwise, the hydrogen chloride in the condensed stream obtained in said concentration step cannot be recovered due to low hydrogen chloride concentration.

According to the present invention it is also preferred if concentrated liquid of said concentration step is heated by said stream containing hydrogen chloride in an external circulation of the concentration step. The concentrated liquid in said concentration step is partially removed from said concentration step and fed into a condenser/heat exchanger, where condensation energy of the stream containing hydrogen chloride generated in the hydrolysis step is used to heat up said concentrated liquid. Afterwards, the concentrated liquid is fed back to the said concentration step. This method of the so-called heat recovery is advantageous because only one condenser/heat exchanger is used so that the investment costs of the plant are minimized.

Preferably the stream containing hydrogen chloride is condensed to give a hydrochloric acid at a concentration of 20 to 35% by weight. Hydrochloric acid having a concentration in such a range can be used for a wide field of washing-, etching- and leaching applications. In this case no water or condensed steam obtained in the concentration step is added to the stream containing hydrogen chloride generated in said hydrolysis step.

According to a further embodiment of the present invention at least part of the liquid containing ferric oxide generated by said hydrolysis step is recirculated to any previous step. If the oxidation step runs in a continuously stirred reactor, small amounts of ferrous chlorides remain in the solution. In order to avoid accumulation of non hydrolyzing ferrous chloride in the hydrolysis step, a part of the liquid generated in said hydrolysis step is removed and fed to any previous process step so that remaining ferrous chloride in the liquid generated in the hydrolysis step is oxidized again in said oxidation step.

Furthermore, it is advantageous if the waste iron chloride solution stems from the pickling of steel, the pre-treatment for zinc plating, leaching of iron containing ores by means of hydrochloric acid or from the etching treatment of semiconductor lead frames.

According to the present invention, the waste iron chloride solution may be efficiently treated with much less heat supplied from outside in the form of steam etc. than in conventional methods, ferric oxide may be generated with a significant higher purity than in conventional methods containing only few impurities such as chlorine, etc., and ferric oxide is also easily separated from the mother liquid because the average particle diameter is larger. Further, in the process of condensing the stream containing hydrogen chloride discharged from the hydrolysis step to recover hydrochloric acid, said stream containing hydrogen chloride may be advantageously used as a heat source to provide for a temperature of at least 75° C. during said concentration step, so the thermal energy used in the entire process may be reduced by some 30 to 40%. In addition, as in the present invention the concentration of the recovered hydrochloric acid may be suitably controlled in the range of at least 10% weight, preferably at least 15% by weight, any concentration suitable for re-use may be selected.

The waste iron chloride solution of the present invention may be obtained from waste hydrochloric acid generated e.g. in the pickling of steel using hydrochloric acid at a concentration of 18-20% by weight, in the pre-treatment of zinc plating, leaching of iron containing ores by means of hydrochloric acid or in the etching treatment of semiconductor lead frames, etc. This waste iron chloride solution comprises ferrous chloride (FeCl$_2$), which is formed by the reaction of hydrochloric acid and iron in the washing process, and free hydrochloric acid. Further, in washing and etching processes hydrochloric acid reacts not only with iron, but also with other metals such as e.g. zinc, nickel, copper, aluminium, manganese, chromium, titanium, cobalt, calcium, sodium and magnesium, and therefore it contains one or more of these metal chlorides as impurities.

Said waste iron chloride solution is treated according to the present invention. The present invention will be explained herein using the example of hydrochloric acid waste liquid discharged when steel is washed with hydrochloric acid.

FIG. 1 shows a flow sheet of a preferred embodiment of the present invention. The present invention comprises (A) a concentration step, (B) an oxidation step, (C) an hydrolysis step, and (D) a separation and recovery step. Each step will be explained in detail hereinafter.

(A) Concentration Step

The hydrochloric acid waste liquid (1) contains ferrous chloride and a small amount of hydrochloric acid at a concentration of 0-5% by weight. In the concentration step, water and free hydrochloric acid contained in said hydrochloric acid waste liquid (1) are partially evaporated in a concentrating apparatus 1. Hydrochloric acid waste liquid (1) is supplied to a concentrating apparatus 1 and concentrated under reduced pressure, preferably 10-50 kPa (absolute pressure), particularly preferably 20-30 kPa (absolute pressure), preferably at 65-100° C., particularly preferably at 80-90° C.

As shown in FIG. 1, concentrating apparatus 1 is heated by supplying part of the concentrated liquid (2) taken from concentrating apparatus 1 to condenser 5 and by recycling the liquid obtained from condenser 5, which is heated to at least 75° C., to concentrating apparatus 1. In this case, the present invention may be carried out at far lower costs than the conventional method according to JP 2006-137118 A and U.S. Pat. No. 3,682,592.

The liquid evaporated in concentrating apparatus 1 is condensed in condenser 2 to obtain condensed aqueous solution containing hydrochloric acid if present in the hydrochloric acid waste liquid.

In said concentration step, hydrochloric acid waste liquid (1) is concentrated to a ferrous chloride concentration of preferably at least 30% by weight, more preferably—40-45% by weight by evaporating the water component. If the ferrous chloride concentration is lower than 30% by weight, the oxidation reaction will become slow, which is not preferable. On the other hand, if the ferrous chloride concentration is higher than 50% by weight, ferrous chloride may crystallize and precipitate.

(B) Oxidation Step

The concentrated liquid (2) concentrated in the concentration step to a ferrous chloride concentration of at least 30% by weight, preferably at least 40% by weight, is supplied to an oxidation reactor 3, and the ferrous chloride contained in the concentrated liquid (2) is oxidized to ferric chloride. As in the present invention the concentration of ferrous chloride is high, as described above, the oxidation reaction rate is very high. Both compressed air and oxygen may be used as an oxidant.

In the oxidation reaction from ferrous chloride to ferric chloride, ferrous chloride reacts with oxygen and is converted to ferric chloride and ferric oxide according to the following reaction formula.

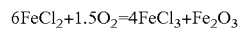

Further, in this oxidation step, free hydrochloric acid contained in the concentrated liquid (2) reacts with part of the ferrous chloride and is converted to ferric chloride according to the following formula.

As the oxidation reaction according to the above reaction formula is an exothermic reaction, the temperature of the oxidized liquid is controlled and maintained at 140-160° C. at superatmospheric pressure.

As in said oxidation step the hydrolysis reaction does not proceed in the form of ferrous chloride, the oxidation rate from ferrous chloride to ferric oxide has to be as high as possible, preferably at least 95%, more preferably at least 99%. If the oxidation rate is low, FeCl$_2$ will accumulate in the hydrolyzed liquid, which is not preferable. Further, chlorine impurities contained in the ferric oxide recovered from the hydrolysis step as described below will increase, which is not preferable, either. However, the present method has the advantage that ferrous chloride will not accumulate, at least part of the liquid containing ferric oxide generated by said hydrolysis step can be recirculated to any previous step as will be shown in FIG. 2 herein after, and therefore the oxidation rate need not be completly at all.

(C) Hydrolysis Step

Subsequently, said oxidized liquid (4) containing ferric chloride is supplied to a hydrolysis reactor 4, and ferric chloride is hydrolyzed according to the following reaction formula.

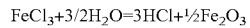

In the hydrolysis step, ferric chloride is hydrolyzed, and ferric oxide and large amounts of hydrogen chloride are generated. In the present invention, in this hydrolysis step, the concentration of ferric chloride in the liquid in the hydrolysis reactor 4 has to be maintained at least 65% by weight, preferably 70-80% by weight. If the ferric chloride concentration is lower than 65% by weight, the concentration of recovered hydrogen chloride will be low, which is not preferable. If, on the other hand, the ferric chloride concentration is too high, iron oxy chloride (FeOCl) will be generated as byproduct, which is not preferable, either.

The temperature for carrying out hydrolysis will vary according to the pressure in hydrolysis reactor 4, but preferably the ferric chloride solution to be hydrolyzed is boiling. In any case, a temperature of preferably 155-350° C., more preferably 160-200° C. is required. If the boiling temperature of the hydrolysis step is lower than 155° C. at a ferric chloride concentration of at least 65% by weight, iron oxychloride (FeOCl) will be generated as a byproduct, and the ferric oxide will contain chlorine etc. as impurities. If the pressure in the hydrolysis reactor 4 is normal pressure (atmospheric pressure), and if the hydrolysis temperature is preferably 160-180° C., particularly preferably 165-175° C., ferric trioxide (Fe$_2$O$_3$) with significant higher purity may be obtained having an average particle diameter of preferably 10-70 μm, more preferably 20-50 μm, which is ideal.

It is not necessary for the pressure in hydrolysis reactor 4 to always be at normal pressure (atmospheric pressure). As required, the pressure may be increased to about 0.3 MPa (absolute pressure), or, in order to protect the material, the pressure may be reduced to preferably 0.05-0.1 MPa, more preferably to 0.08-0.1 MPa (absolute pressure).

As described above, the hydrolysis step is carried out under normal pressure, under high pressure or under low pressure while maintaining the temperature in the range mentioned above, and while maintaining the concentration of ferric chloride in the liquid containing ferric chloride in hydrolysis reactor 4 at a level of at least 65%, and preferably while maintaining the ferric chloride solution to be hydrolyzed in its boiling state which is preferable to remove water and hydrogen chloride from the hydrolysis reactor 4 to generate a stream containing hydrogen chloride.

(4) Separation and Recovery Step

By hydrolysis under the conditions described above, ferric oxide and a stream containing hydrogen chloride are generated in hydrolysis reactor 4 according to the present invention. Iron oxide and hydrochloric acid are separated and recovered according to the present invention as described hereinafter. The iron oxide containing only little chlorine has an average particle diameter that may be easily separated. The recovered hydrochloric acid may be adjusted to have an appropriate concentration of at least 10% by weight, preferably 15% by weight, and even effectively useful thermal energy is recovered, which was difficult with conventional methods.

Namely, according to the present invention, ferric oxide particles are separated from the liquid (6), e.g. in a centrifugal separator, in a filter press or even more preferably by means of a belt filter, washed with water, then dried again in a drying furnace and recovered as a powder. According to X-ray diffraction analysis, the recovered iron oxide is almost exclusively ferric trioxide ($Fe_2O_3$), its particle diameter is large, its chlorine content is low. By contrast, iron oxide obtained according to conventional methods has a small particle diameter, it contains chlorine, and it is not very pure.

Further, as mentioned above, the ferric oxide particles recovered according to the present invention preferably have an average diameter (D50) of 10-70 μm, more preferably 20-50 μm, and they can be easily separated and recovered from the mother liquid. If the hydrolysis temperature exceeds the 180° C. mentioned above, the average diameter of the generated particles may be smaller, which results in the separation from the hydrolyzed liquid (6) to be much more difficult.

According to the present invention, the stream (5) containing hydrogen chloride generated by hydrolysis is condensed in a condenser 5 and hydrochloric acid is recovered, but in the present invention hydrochloric acid may be recovered at any concentration of at least 10% by weight, preferably at least 15% by weight. If the concentration of the recovered hydrochloric should be adjusted down to a lower concentration of 15 to 20% by weight, water or a water/HCl mixture coming from the condenser 2 may be added to the stream containing hydrogen chloride before it is fed to in condenser 5 and condensed, thus decreasing the hydrogen chloride concentration and ensuring a high hydrogen chloride condensation temperature. In this case, a condenser of the gas liquid direct contact type or a condenser of the falling film type is used as condenser 5, water is used as absorption liquid, and condensation of the stream (5) containing hydrogen chloride takes place while water is added either prior to or during said heat exchange/recovery step. The water added to the stream containing hydrogen chloride may be pure water supplied from outside, or condensed aqueous solution (3) obtained from said concentration step may be used as well. The latter case is even more useful, because the condensed aqueous solution contains hydrogen chloride, and this hydrogen chloride may be recovered as well. The heat obtained from said condenser 5, which preferably has a temperature of at least 75° C., is used as a heating medium to heat the liquid to be concentrated (2) in said concentration step. Of course it is also possible to use the stream (5) containing hydrogen chloride for a direct heating of concentrator 1, e.g. by guiding the stream through coils provided around the concentrator 1.

Alternatively, a heat transfer medium may be used to transfer heat generated by condensation of stream (5) containing hydrogen chloride to the concentrator 1, again either to heat an external circulation of liquid (2) or to heat the concentrator 1 directly.

In any case, the present invention may be carried out at far lower costs than the conventional methods according to U.S. Pat. No. 3,682,592 B or JP 2006-137118 A.

As in the present invention hydrochloric acid is recovered having a concentration up to 20% by weight and thus the condensation temperature of the stream containing hydrogen chloride in condenser 5 is high, it is easy to obtain a high temperature heating medium for the condensation process, which has preferably at least 75° C., more preferably 75° C.-110° C., even more preferably 90° C.-108° C. In the present invention, this is possible because hydrolysis is carried out in said high boiling temperature range of 155-200° C., and therefore the related pressure ensures a high condensation temperature of the stream containing hydrogen chloride generated in hydrolysis reactor 4. As in the conventional method according to JP 2006-137118 A, hydrolysis is carried out at a lower temperature of about 125-150° C. due to reduced pressure, any heating medium obtained will only have 60° C. or less, even if the method is carried out in the same way, and it is difficult to effectively use a heating medium having such a low temperature.

On the other hand, in the present invention, if the concentration of 20-35% by weight, preferably 25-35% by weight, of the recovered hydrochloric acid is appropriate as it is, condensation in the condenser 5 is realized without any addition of water or aqueous solution from the concentration step, whereas the resulting temperature of the heating medium is depending on the concentration of the hydrogen chloride in the hydrogen chloride containing stream. Said highly concentrated hydrochloric acid of 20-35% by weight may be advantageously used in a wide variety of fields.

Figure 2:
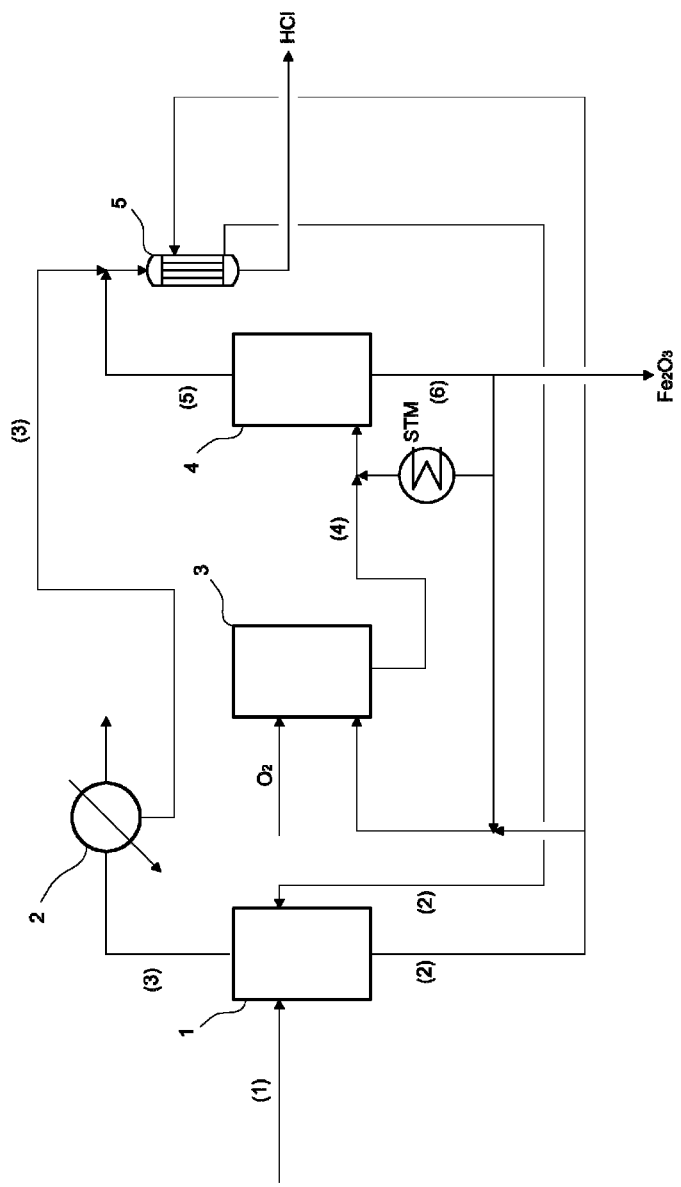

FIG. 2 shows a flow sheet of another preferable embodiment of the present invention. The numbers in FIG. 2 have the same meanings as in FIG. 1. In the embodiment of FIG. 2, a part of the hydrolyzed liquid containing ferric oxide (6) taken from hydrolysis reactor 4 is added to the oxidized liquid (4) supplied to hydrolysis reactor 4 and recycled to hydrolysis reactor 4. The remainder is added to the concentrated liquid (2) discharged from the concentration step in this example as shown in FIG. 2. At least part of the liquid containing ferric oxide generated by said hydrolysis step is recirculated to any previous step. Alternatively, at least part of the liquid containing ferric oxide generated by said hydrolysis step is recirculated to the waste iron chloride solution or any other previous process step.

This embodiment has the advantage that even if the oxidation rate in the oxidation reactor is not sufficient, this will not have any negative effects such as lowering the hydrochloric acid recovery rate due to the accumulation of ferrous chloride. Hereinafter, the present invention will be described more concretely using examples, but, of course, the invention should not be understood to be limited thereto. Unless specified otherwise, "percent" means "percent by weight".

EXAMPLE 1

Liquid (1) discharged from the process of washing steel with hydrochloric acid was treated according to the flow sheet of FIG. 1. The discharged liquid (1) had the following composition:

FeCl$_2$: 22.0%, FeCl$_3$: 0.0%, HCl: 1.7%, H$_2$O: 76.5%, Fe$_2$O$_3$: 0.0%. Its temperature was 70° C.

Discharged liquid (1) was supplied to an FRP concentrating apparatus 1 at a rate of 15000 kg/hour. The pressure in concentrating apparatus 1 was reduced to 32 kPa using a vacuum pump via condenser 2. The liquid in the concentrating apparatus is heated in condenser 5 by said stream containing hydrogen chloride discharged from hydrolysis reactor 4 in an external circulation.

7932 kg/hour of concentrated liquid (2) enriched in ferrous chloride, being composed of FeCl$_2$: 41.6%, FeCl$_3$: 0.0%, HCl: 0.6%, H$_2$O: 57.8%, Fe$_2$O$_3$: 0.0%, and 7067 kg/hour of condensed liquid (3), being composed of FeCl$_2$: 0.0%, FeCl$_3$: 0.0%, HCl: 3.0%, H$_2$O: 97.0%, Fe$_2$O$_3$: 0.0% were obtained from concentrating apparatus 1.

Then, said concentrated liquid (2) was supplied to oxidation reactor 3 at a rate of 7932 kg/hour and oxidized by oxygen. The oxidation reactor 3 was maintained at a pressure of 0.7 MPa and a temperature of 150° C., and oxygen was supplied at a rate of 206 kg/hour. Residence time in the oxidation reactor was 4 hours. 8139 kg/hour of liquid containing ferric oxide were obtained from oxidation reactor 3, having the following composition:

FeCl$_2$: 0.0%, FeCl$_3$: 35.1%, HCl: 0.0%, H$_2$O: 56.9%, Fe$_2$O$_3$: 8.1%.

This oxidized liquid (4) containing ferric chloride was supplied to hydrolysis reactor 4. Hydrolysis was carried out by heating the liquid containing ferric oxide (6) removed from hydrolysis reactor 4 via a heat exchanger 6 and recycling it to hydrolysis reactor 4, maintaining a pressure of 0.1 MPa, a temperature of 175° C. and a ferric chloride concentration of 77% by weight.

Due to hydrolysis, a stream containing hydrogen chloride (5) was obtained from hydrolysis reactor 4 having the following composition:

FeCl$_2$: 0.0%, FeCl$_3$: 0.0%, HCl: 29.0%, H$_2$O: 82.0%, Fe$_2$O$_3$: 0.0%.

Said steam containing hydrogen chloride (5) was supplied to a gas liquid direct contact type condenser 5. In gas liquid direct contact type condenser 5, the condensed liquid (3) obtained from said concentrating apparatus 1 was used as absorption liquid, and the circulated liquid of concentrating apparatus 1 was used heated. Thereby, hydrochloric acid having a concentration of 18% by weight was recovered from gas liquid direct contact type condenser 5. On the other hand, the liquid containing iron oxide (6) was subjected to solid-liquid separation using a centrifugal filter to obtain ferric oxide (Fe$_2$O$_3$) powder having an average particle diameter of 30 μm and containing 0.1% by weight of chlorine. The filtrate was recirculated via heat exchanger 6 to hydrolysis reactor 4.

The recirculated liquid of concentrating apparatus 1 obtained from said condenser 5 at a temperature of 95° C. was cooled to 70° C. by evaporating water and hydrochloric acid in the concentrating apparatus 1. The (2) was then returned again to the gas liquid direct contact type condenser 5 to be heated by the stream (5) containing hydrogen chloride generated in the hydrolysis reactor 4. In the entire process described above, i.e. in the concentration step, in the oxidation step, and in the hydrolysis step, the only energy provided was to heat exchanger 6, the amount of heat supplied as steam was 9200 kg/h.

EXAMPLE 2

Comparative Example

A discharged liquid (1) was used which had the same composition as the one treated in executive example 1. The process was the same as in example 1, except that the hydrolysis step was carried out under the conditions described in JP 2006-137118 A, i.e. under reduced pressure of 100 mm Hg at 145° C. As a result, the stream containing hydrogen chloride generated in hydrolysis reactor 4 was supplied to condenser 5, and hydrochloric acid having a concentration of 29% by weight was recovered by condensation with water medium. As the temperature of the water medium discharged from condenser 5 was as low as 40° C., it was difficult to use it effectively.

On the other hand, the liquid (6) containing ferric oxide generated in hydrolysis reactor 4 was subjected to solid-liquid separation, and the obtained average particle diameter was 10 μm or less, i.e. the iron oxide powder was extremely difficult to filter. In this case, in the entire process, i.e. in the concentration step, in the oxidation step, and in the hydrolysis step, the amount of heat supplied as steam from outside was 17960 kg/h, 95% more than in example 1.

EXAMPLE 3

In this example, part of the liquid containing ferric oxide generated in the hydrolysis step in example 1 was added to the concentrated liquid containing ferrous chloride obtained in the concentration step and supplied to the oxidation reactor mentioned above according to the flow sheet of FIG. 2. After concentrating the liquid (1) discharged from the washing step in example 1, when adding it as liquid (2) to oxidation reactor 3, liquid containing ferric oxide (6) was added at a rate of 16000 kg/h to give 23900 kg/h feed for oxidation reactor 3, giving a solution with the following composition:

FeCl$_2$: 12.7%, FeCl$_3$: 50.4%, HCl: 0.2%, Fe$_2$O$_3$: 0.5%.

In the oxidation reactor, the pressure was maintained at 0.7 MPa, the temperature was maintained at 150° C., and 206 kg/h of oxygen were added as in example 1. This time, residence time in the oxidation reactor was 2 hours. 24100 kg/h of oxidized liquid containing ferric chloride were obtained from oxidation reactor 3, having the following composition:

FeCl$_2$: 0.7%, FeCl$_3$: 61.3%, HCl: 0.0%, H$_2$O: 34.9%, Fe$_2$O$_3$: 3.1%.

This oxidized liquid containing ferric chloride (4) was supplied to hydrolysis reactor 4, and the same results were obtained as in example 1.

This time, residence time in the oxidation reactor was only about half as long as in example 1, and the oxidation rate was about 90%, but even though some unoxidized FeCl$_2$ remained in the hydrolyzed liquid, it did not accumulate in the system, and stable results were obtained.

The invention claimed is:

1. A method of processing a waste iron chloride solution including ferrous chloride, ferric chloride or possible mixtures thereof and optionally free hydrochloric acid, the method comprising the following steps:

in a concentration step, concentrating the waste iron chloride solution into a concentrated liquid having a total iron chloride concentration of at least 30% by weight;

in an optional oxidation step, oxidizing ferrous chloride contained in the concentrated liquid obtained from the concentration step into ferric chloride to obtain a liquid containing ferric chloride;

in a hydrolysis step, hydrolyzing the liquid containing ferric chloride optionally obtained from the oxidation step or hydrolyzing the concentrated liquid obtained from the concentration step containing ferric chloride at a temperature of 165-175° C. while maintaining the ferric chloride concentration at a level of 70 to 80% by weight, to generate a stream containing hydrogen chloride and liquid containing ferric oxide;

in a separation step, separating ferric oxide from the liquid containing ferric oxide obtained in the hydrolysis step;

in a recovery step, condensing the stream containing hydrogen chloride obtained in the hydrolysis step to recover hydrochloric acid at a concentration of at least 10% by weight;

directly or indirectly using condensation energy of the hydrogen chloride containing stream obtained in the recovery step as a heating source for the concentration step; and performing the concentration step under reduced pressure.

2. The method according to claim 1, which further comprises concentrating the waste iron chloride solution into a concentrated liquid having a total iron chloride concentration of at least 40% by weight in the concentration step.

3. The method according to claim 1, which further comprises condensing the stream containing hydrogen chloride obtained in the hydrolysis step to recover hydrochloric acid at a concentration of at least 15% by weight in the recovery step.

4. The method according to claim 1, which further comprises adding water to the stream containing hydrogen chloride obtained in the hydrolysis step either prior to or during the recovery step and condensing, to recover hydrochloric acid from the stream at any adjustable concentration of at least 10% by weight, and using the stream containing hydrogen chloride as a heating source to provide for a temperature of at least 75° C. during the concentration step.

5. The method according to claim 4, which further comprises recovering hydrochloric acid from the stream at any adjustable concentration of at least 15% by weight.

6. The method according to claim 4, which further comprises using a condensed aqueous solution obtained from the concentration step in addition to or instead of the water added to the stream containing hydrogen chloride.

7. The method according to claim 1, which further comprises heating the concentrated liquid of the concentration step with the stream containing hydrogen chloride in an external circulation of the concentration step.

8. The method according to claim 1, which further comprises condensing the stream containing hydrogen chloride to yield a hydrochloric acid at a concentration of 20 to 35% by weight.

9. The method according to claim 1, which further comprises recirculating at least part of the liquid containing ferric oxide generated by the hydrolysis step to any previous step.

10. The method according to claim 1, which further comprises obtaining the waste iron chloride solution from pickling of steel, pre-treatment for zinc plating, leaching of iron containing ores by hydrochloric acid or etching treatment of semiconductor lead frames.

* * * * *